United States Patent
Song

(10) Patent No.: US 10,807,277 B2
(45) Date of Patent: Oct. 20, 2020

(54) RESIN-INFUSED SHORT FIBER COMPOSITE MATERIALS

(71) Applicant: The Boeing Company

(72) Inventor: Weidong Song, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 254 days.

(21) Appl. No.: 15/344,755

(22) Filed: Nov. 7, 2016

(65) Prior Publication Data

US 2018/0127897 A1 May 10, 2018

(51) Int. Cl.

| | |
|---|---|
| *B29B 15/10* | (2006.01) |
| *B29B 7/90* | (2006.01) |
| *B29C 70/12* | (2006.01) |
| *B29B 7/84* | (2006.01) |
| *B29C 48/00* | (2019.01) |
| *B29C 48/565* | (2019.01) |
| *B29K 307/04* | (2006.01) |
| *B29K 105/12* | (2006.01) |
| *B29K 101/10* | (2006.01) |
| *B29K 309/08* | (2006.01) |

(52) U.S. Cl.
CPC ............. *B29B 15/10* (2013.01); *B29B 7/84* (2013.01); *B29B 7/90* (2013.01); *B29B 15/105* (2013.01); *B29C 48/0011* (2019.02); *B29C 48/565* (2019.02); *B29C 70/12* (2013.01); *B29K 2101/10* (2013.01); *B29K 2105/12* (2013.01); *B29K 2307/04* (2013.01); *B29K 2309/08* (2013.01)

(58) Field of Classification Search
CPC .. B29C 48/0011; B29C 48/565; B29B 15/105
See application file for complete search history.

(56) References Cited

U.S. PATENT DOCUMENTS

| | | |
|---|---|---|
| 3,496,133 A | 2/1970 | Hoffman |
| 3,668,177 A | 6/1972 | Herpt |

(Continued)

FOREIGN PATENT DOCUMENTS

| | | | |
|---|---|---|---|
| EP | 0755762 A1 | 1/1997 | |
| WO | 1989009123 A1 | 10/1989 | |

(Continued)

OTHER PUBLICATIONS

J.T. Guan et al., Effect of extrusion directly following vacuum pressure infiltration process on compressive properties of Csf/ AZ91D Composites, 2011, Proc. 10th Int. Conf. Techn. Plast. (ICTP 2011) (Year: 2011).*

(Continued)

*Primary Examiner* — Alison L Hindenlang
*Assistant Examiner* — George W. Brady
(74) *Attorney, Agent, or Firm* — Duft & Bornsen, PC

(57) ABSTRACT

Systems and methods are provided for fabrication of short-fiber composites. One embodiment is a method for forming a short-fiber composite. The method includes forming a bed of randomly oriented dry fibers on a base, drawing resin into the bed in response to pressure to form a mixture of randomly oriented fibers impregnated with thermoset resin, perturbing the mixture while preserving fiber length at the mixture and degassing the mixture, and extruding the mixture to form a preform.

20 Claims, 8 Drawing Sheets

(56) References Cited

U.S. PATENT DOCUMENTS

| | | | | |
|---|---|---|---|---|
| 4,134,714 | A | * | 1/1979 | Driskill ............... B29C 47/28 366/83 |
| 4,616,989 | A | * | 10/1986 | Mewes ................. B29B 7/90 425/203 |
| 4,950,532 | A | | 8/1990 | Das et al. |
| 5,033,860 | A | * | 7/1991 | Nakamura ............ B29C 47/60 366/89 |
| 5,891,374 | A | * | 4/1999 | Shah ..................... B28B 1/52 264/108 |
| 6,414,054 | B1 | * | 7/2002 | Boffard ............... B29B 7/7485 523/322 |
| 2003/0232176 | A1 | * | 12/2003 | Polk, Jr. ............ B29C 31/047 428/167 |
| 2004/0041128 | A1 | * | 3/2004 | Carter .................. C08J 3/24 252/500 |
| 2004/0151058 | A1 | * | 8/2004 | Schafer .............. B29C 48/397 366/77 |
| 2006/0073319 | A1 | * | 4/2006 | Roberson ............ B27N 3/002 428/292.1 |
| 2006/0103045 | A1 | * | 5/2006 | O'Brien-Bernini ..................... E04F 13/0864 264/45.9 |
| 2006/0125156 | A1 | | 6/2006 | Woolhouse |
| 2006/0272278 | A1 | | 12/2006 | McMahan et al. |
| 2009/0230223 | A1 | * | 9/2009 | Stall .................... B29B 7/94 241/5 |
| 2014/0308519 | A1 | * | 10/2014 | George ............... B29C 48/022 428/402 |
| 2016/0082641 | A1 | | 3/2016 | Bogucki et al. |
| 2017/0081487 | A1 | * | 3/2017 | Smolka ................. C08J 5/24 |
| 2018/0030924 | A1 | * | 2/2018 | Coppola .............. B29C 66/21 |

FOREIGN PATENT DOCUMENTS

| | | |
|---|---|---|
| WO | 9853968 A1 | 12/1998 |
| WO | 03078143 A1 | 9/2003 |
| WO | 2009120920 | 1/2010 |
| WO | 2008149615 A9 | 3/2010 |
| WO | 2014045971 A1 | 3/2014 |

OTHER PUBLICATIONS

T.D. Jagannatha and G. Harish, Mechanical Properties of Carbon/Glass Fiber Reinforced Epoxy Hybrid Polymer Composites, 2015 Int. J. Mech. Eng. & Rob. Res. 2015 (Year: 2015).*

Zhang et al., Investigation on the Uniformity of High-Density Polyethylene/Wood Fiber Composites in a Twin-Screw Extruder, 2009, Wiley InterScience (Year: 2009).*

"What is resin infusion (or vacuum infusion)?", Retreived from: https://www.vacmobiles.com/resin_infusion.html , Available since Sep. 28, 2012 (Year: 2012).*

Fimor North America, What is the Process of Plastic Extrusion?, May 26, 2015 (Year: 2015).*

Hydraulics & Pneumatics, "Fundamentals of Vacuum" (Year: 2012).*

Flake C. Campbell; Compression Molding; Jan. 1, 2004.

Miracle D B et al; Composites, Molding Compounds; Dec. 1, 2001.

European Search Report; EP17199737; dated Mar. 20, 2018.

Frank M White; Viscous Fluid Flow; McGraw-Hill International Second Edition.

Gad Hetsroni; Handbook of Multphase Systems.

Readco Kurimoto, LLC 2016; Continuous Mixing; http://www.foregosystemsinc.com.

Resin Transfer Molding Process (RTM); 1990-2016 JHM Technologies, Inc.

Vacuum Assisted Resin Transfer Molding Process (VARTM); 1990-2016 JHM Technologies, Inc.; https://www.rtmcomposites.com/process/vacuum-assisted-resin-transfer-molding-vartm.

Vacuum Bagging Techniques: 2010 Gougeon Brothers, Inc. Bay City, MI; 7th Edition; Apr. 2010.

Vacuum Infusion—The Equipment and Process of Resin Infusion. What is resin infusion (or vacuum infursion)?; Vacman@vacmobiles.com.

* cited by examiner

RESIN-INFUSED SHORT FIBER COMPOSITE MATERIALS

FIELD

The disclosure relates to the field of fiber reinforced composites, and in particular, to short fiber reinforced composite materials.

BACKGROUND

Many fiber materials such as carbon, glass, Kevlar, and so on, are used for a variety of purposes in order to reduce weight while providing a desired level of structural performance. For example, continuous-fiber composite parts utilize individual strands of carbon that are oriented in layers. The strands of carbon fiber within each layer are parallel and extend for feet or even hundreds of feet in a desired direction. The fibers in each layer enhance the strength of the resulting composite part with respect to a specific direction of loading force. By combining layers having different fiber orientations, a composite part may be fabricated that exhibits structural strength in a variety of directions.

While continuous-fiber composite parts are highly desirable, they may not be economical or technically feasible in certain applications. For example, it may not be economical to fabricate a particularly narrow or small continuous-fiber composite part that exhibits strength in multiple directions. Short-fiber composite materials may therefore be utilized for such composite parts. Short-fiber composite materials are distinguished from continuous-fiber materials in that short-fiber materials utilize a substantially shorter length than continuous-fiber materials. Short fibers range from one quarter inch to one eighth of an inch long. An additional difference between short-fiber and continuous-fiber materials is that individual fibers within short-fiber materials exhibit random orientations and hence are not parallel on a layer-by-layer basis. These physical characteristics make short-fiber materials substantially isotropic. These characteristics also cause short-fiber materials to undesirably exhibit reduced strength with respect to continuous-fiber composites.

Thus, designers of short-fiber composite parts continue to seek out enhancements to short-fiber composite materials that will increase strength.

SUMMARY

Embodiments described herein provide for short-fiber composite materials that utilize pressurized resin impregnation in combination with high-pressure extrusion. This technique substantially increases an amount of resin penetration into a dry fiber bed of randomly oriented short fibers. Increasing the amount of resin impregnation reduces porosity of the resulting mixture and thereby enhances the structural performance of resulting short-fiber composite parts that are cured from the mixture.

One embodiment is a method for forming a short-fiber composite. The method includes forming a bed of randomly oriented dry fibers on a base, drawing resin into the bed in response to pressure to form a mixture of randomly oriented fibers impregnated with thermoset resin, perturbing the mixture while preserving fiber length at the mixture and degassing the mixture, and extruding the mixture to form a preform.

Another embodiment is a material. The material includes a composite part having a porosity of less than one percent by volume. The composite part includes a matrix of randomly oriented fibers that are each less than half of an inch long, and thermoset resin distributed throughout the fibers.

Another embodiment is a system that includes a resin impregnator. The resin impregnator includes a base, a pressure source that forces thermoset resin through a bed of randomly oriented dry fibers at the base to form a mixture of impregnated fibers at the base, and an exit pathway for air from the fiber bed to exit the apparatus. The apparatus also includes an extruder. The extruder includes a port dimensioned to receive the mixture, and a first section that includes a first auger fed by the port that mixes the mixture while preserving fiber length at the mixture, and moves the mixture towards a second section, the first section further including a vacuum port that removes gas from the first section. The extruder also includes the second section, which includes a second auger that perturbs the mixture at a second compression pressure that is greater than the first compression pressure while preserving fiber length at the mixture. The second auger moves the mixture towards an extruder die nozzle. The second section also includes a heated shell that surrounds the second auger. The extruder further includes the extruder die nozzle, which has an aperture for the mixture to leave the extruder, and is attached to the second section.

Another embodiment is an apparatus that includes an extruder. The extruder includes a port dimensioned to receive a mixture of fiber impregnated with thermoset resin, and a first section that includes a first auger fed by the port that mixes the mixture while preserving fiber length at the mixture, and moves the mixture towards a second section. The first section further includes vacuum port that removes gas from the first section. The extruder also includes the second section. The second section includes a second auger that perturbs the mixture at a second compression pressure that is greater than the first compression pressure while preserving fiber length at the mixture, the second auger further moving the mixture towards an extruder die nozzle. The second section additionally includes a heated shell that surrounds the second auger. The extruder also includes the extruder die nozzle, which has an aperture for the mixture to leave the extruder, and is attached to the second section.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
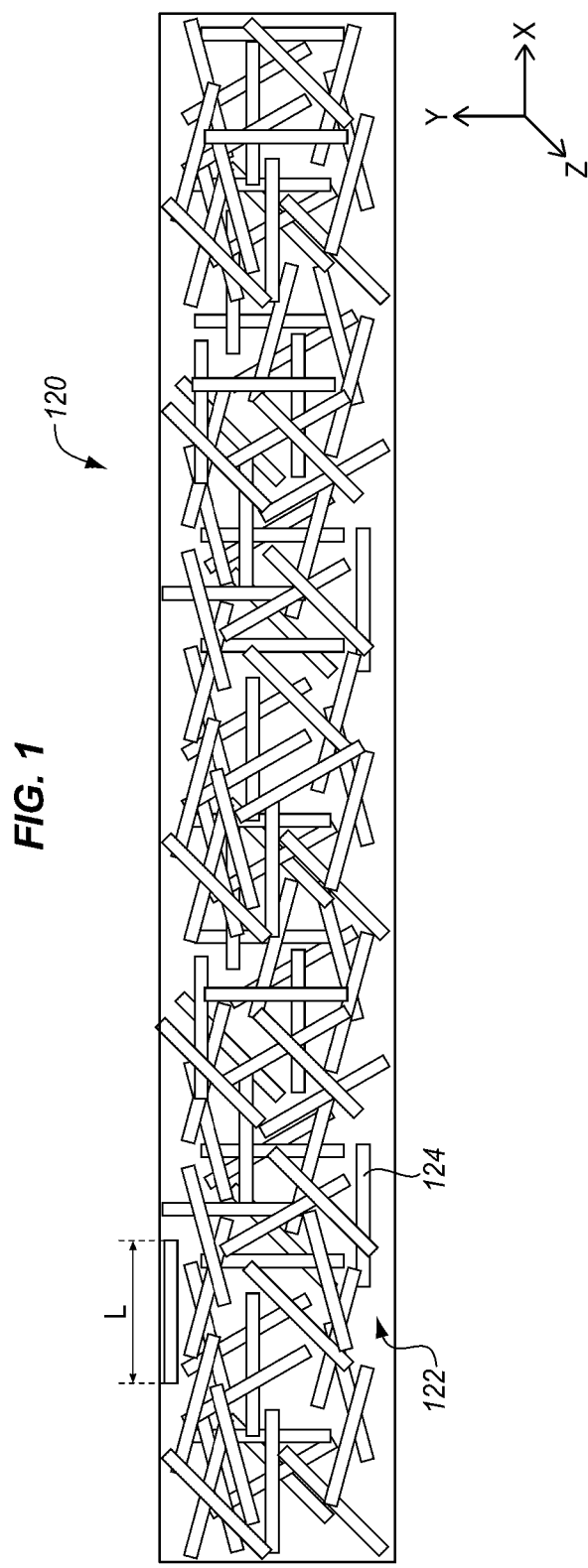
FIG. 1 is a diagram of an enhanced mixture of short fiber in an exemplary embodiment.

FIG. 1 is a diagram of an enhanced short-fiber mixture 120 in an exemplary embodiment. Specifically, mixture 120 has been enhanced to exhibit reduced levels of porosity. Mixture 120 includes short carbon fibers 124. Fibers 124 vary in orientation along the XY plane. Fibers 124 may further exhibit random orientations along any or all of the three spatial axes shown. Fibers 124 are distinguished from continuous fibers in multiple ways. The first distinction is that fibers 124 are randomly oriented (e.g., along all three dimensions) while continuous fibers are all parallel. Fibers 124 may even corkscrew or otherwise exhibit varying orientations along their axial length (L) corresponding with kinks or bends in the fiber. The second distinction is that fibers 124 each exhibit an axial length between an eighth of an inch and half of an inch. This length is long enough to ensure that fibers 124 are capable of enhancing the ability of mixture 120 to endure structural stress after curing. This length is also short enough to ensure that mixture 120 operates as a substantially anisotropic material that may be molded into any suitable shape. Fibers 124 are encapsulated within resin 122. Resin 122 may comprise a thermoset monomer that hardens into a polymer supporting a matrix of fibers 124.

Figure 2:
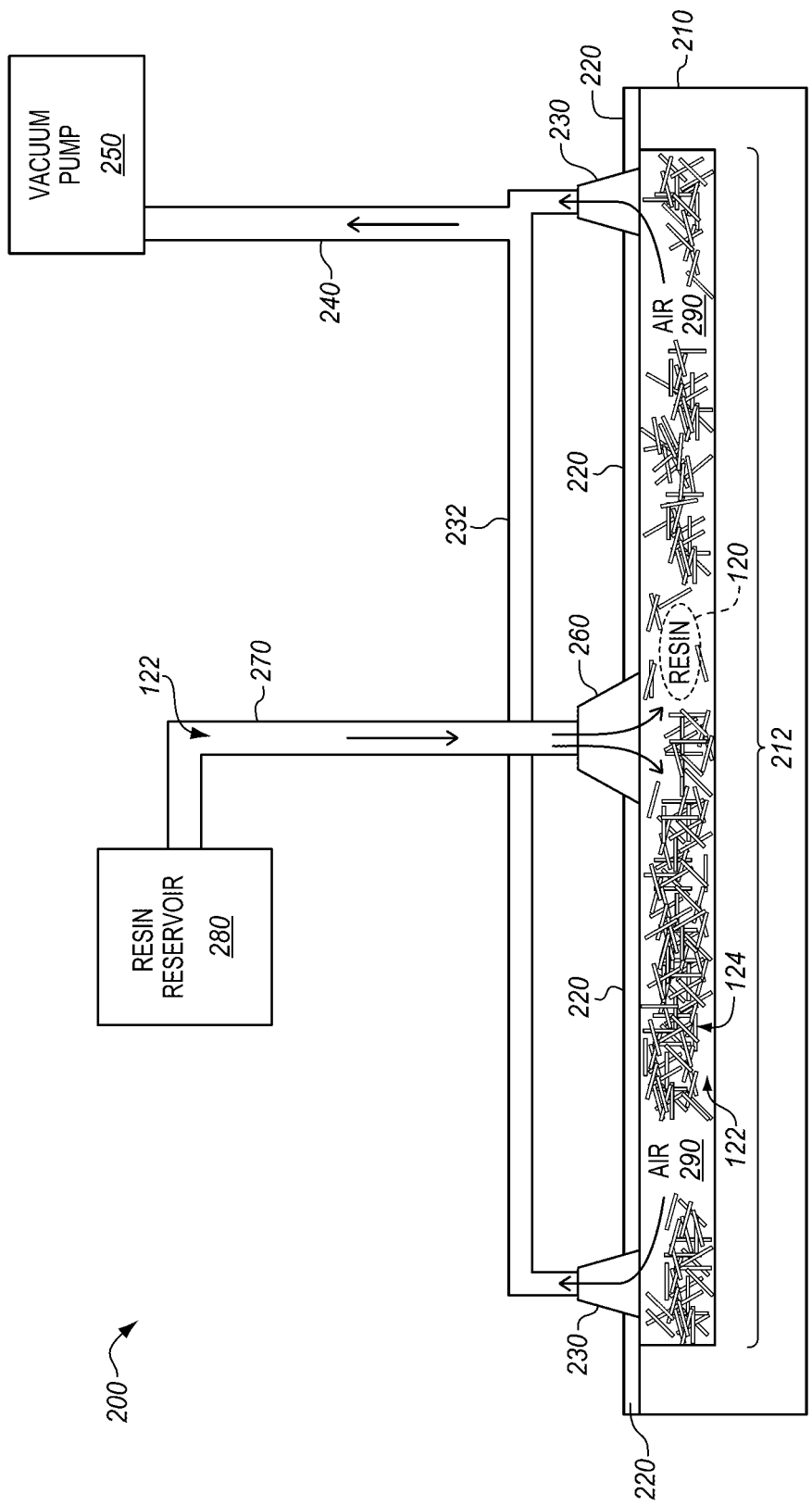
FIG. 2 is a diagram illustrating a resin impregnator in an exemplary embodiment.

Further details of devices that engage in the operation and fabrication of a short-fiber composite material are discussed with regard to FIGS. 2-6. FIG. 2 is a diagram illustrating a resin impregnator 200 in an exemplary embodiment. Resin impregnator 200 has been specifically designed to impregnate a bed 212 of short fibers with resin. Resin impregnator 200 includes base 210. Base 210 receives bed 212 of randomly-oriented short fibers 124. The short fibers are dry, meaning that fibers 124 have not yet been wetted with resin 122.

Resin impregnator 200 also includes vacuum bag 220. Vacuum bag 220 is sealed to base 210 and covers bed 212. Ports 230 and port 260 penetrate vacuum bag 220 to enable the passage of air out of bed 212 and to enable the passage of resin 122 into bed 212. Vacuum bag 220 compresses onto bed 212 when negative pressure is applied to ports 230—via manifold 232 and line 240 as vacuum pump 250 removes air from bed 212. Line 240 therefore acts as an exit pathway for air to leave bed 212. Any number of ports, manifolds, and lines may be implemented as desired in further embodiments.

Vacuum bag 220 in combination with vacuum pump 250 and port 230 operate as a pressure source that lowers pressure at bed 212 below atmospheric pressure by evacuating air 290 through line 240. This negative pressure draws resin 122 out of resin reservoir 280. Resin 122 continues through supply line 270 via port 260 into bed 212. Resin 122 is distributed between individual fibers 124 of bed 212.

Figure 3:
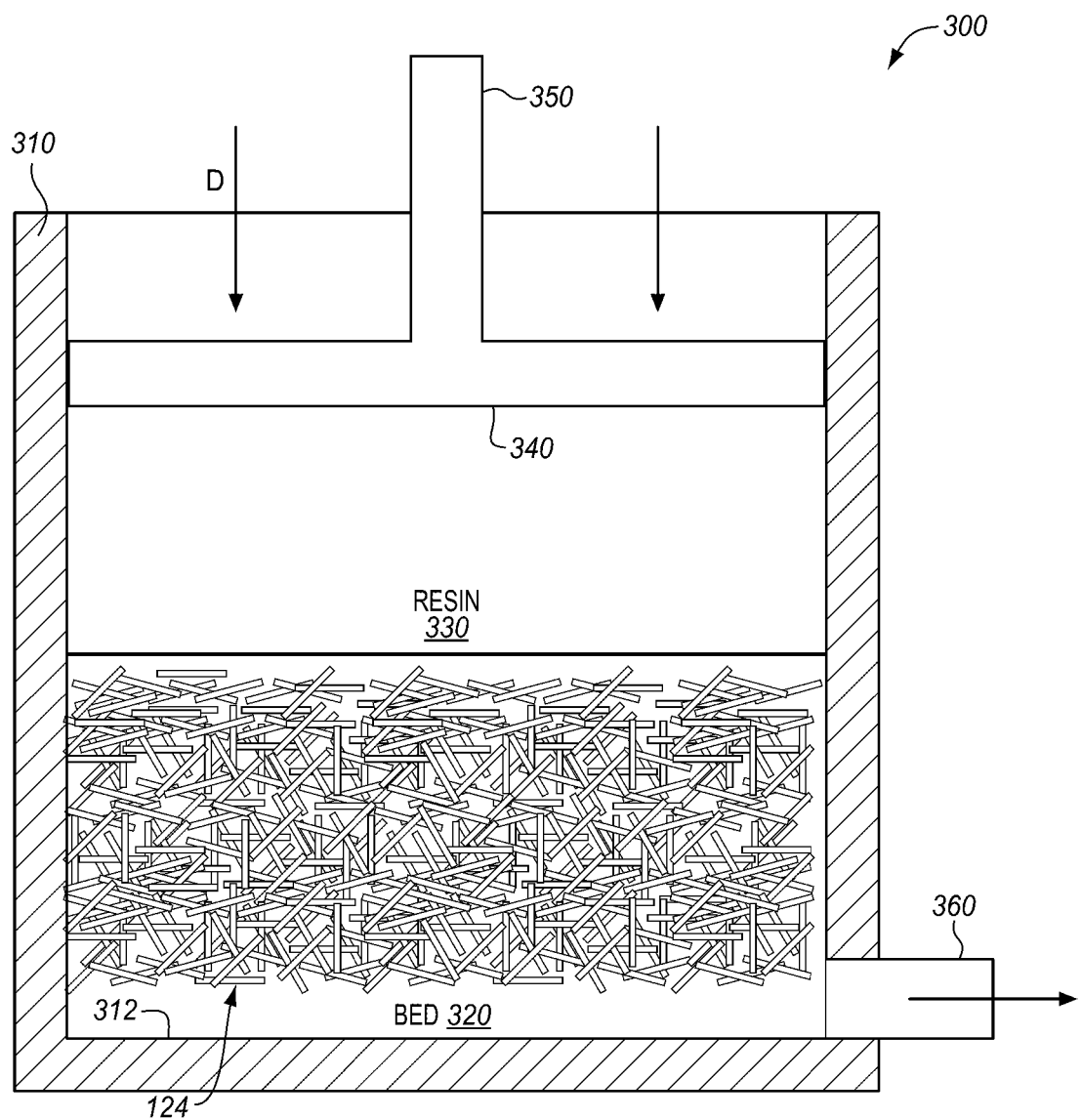
FIG. 3 is a diagram illustrating a further resin impregnator in an exemplary embodiment.

FIG. 3 is a diagram illustrating a further resin impregnator 300 in an exemplary embodiment. Resin impregnator 300 is differentiated from resin impregnator 200 in that resin impregnator 300 utilizes positive pressure instead of negative pressure to impregnate a bed 320 of short carbon fibers. Resin impregnator 300 includes bed 320 of dry and randomly-oriented short fibers laid atop base 312 of pressure vessel 310. Resin impregnator 300 further includes resin 330 in a viscous liquid phase. Resin 330 penetrates bed 320 as pressure is applied by cap 340 moving in direction D. Cap 340 is moved in direction D by forces applied by shaft 350. Cap 340 and shaft 350 therefore operate as a pressure source for resin 330 that causes resin 330 to flow downward and through bed 320. Exit nozzle 360 at base 312 forms an exit pathway for air as resin 330 penetrates bed 320. Resin 330 may further flow through exit nozzle 360 in order to ensure that excess resin does not remain at bed 320. The impregnation of bed 320 with resin 330 results in mixture 120 of FIG. 1.

FIGS. 2-3 both illustrate systems that utilize the application of a pressure differential to drive resin into a bed of dry fibers in order to form a short-fiber mixture. These systems exhibit a substantial benefit in that the utilization of pressure to impregnate a bed of short fiber substantially increases the penetration of resin into the fiber. This means that porosity in the resulting mixture 120 is reduced, as the individual fibers 124 are fully wetted and/or impregnated with resin 122. However, it may be beneficial to reduce porosity even further within mixture 120 and to ensure that resin 122 is evenly mixed throughout fibers 124.

Figure 4:
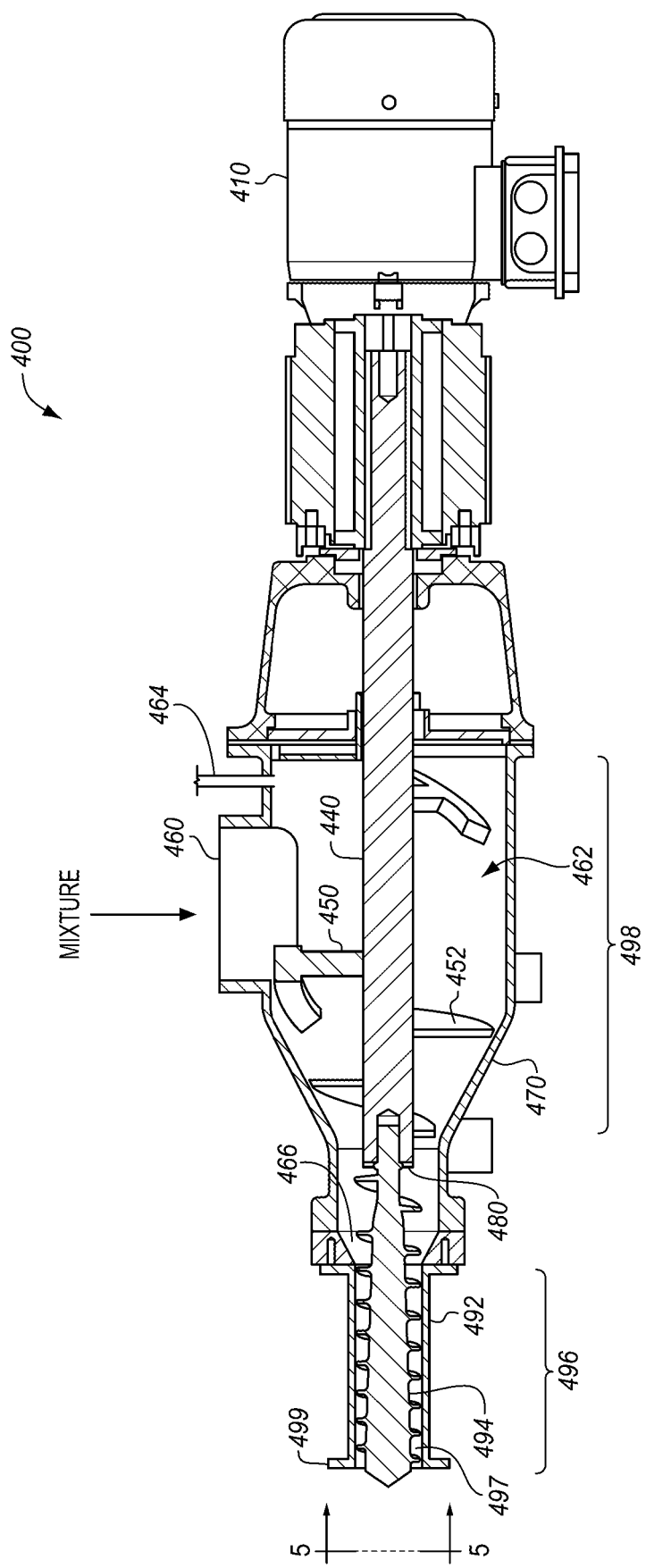
FIG. 4 is a diagram illustrating an extruder in an exemplary embodiment.
Figure 5:
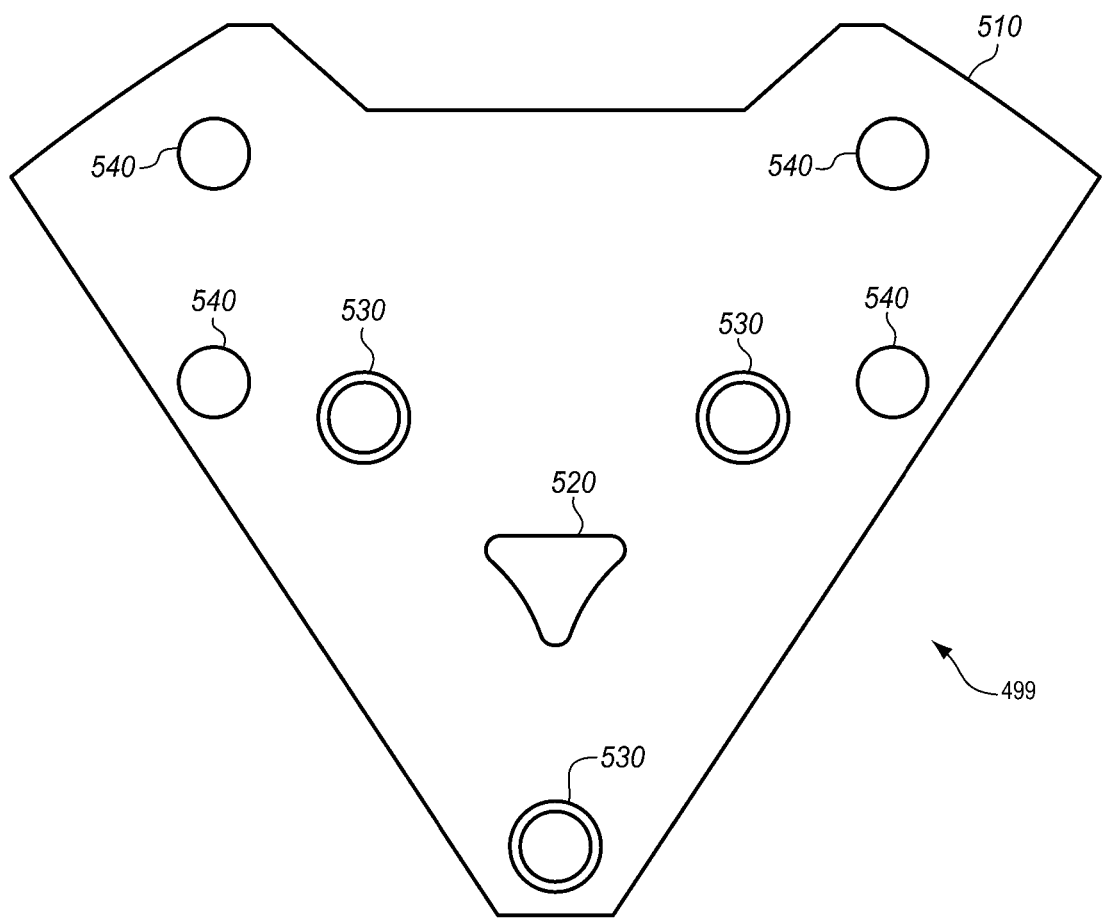
FIG. 5 is a diagram illustrating a die nozzle in an exemplary embodiment.

FIGS. 4-5 illustrate details of an extruder 400 that mixes a mixture 120. Extruder 400 advantageously stirs/mixes the components of the mixture together without damaging individual fibers 124 within mixture 120. This specifically means that fibers 124 are not chopped or otherwise reduced in length during the perturbing process. Preserving the length of fibers 124 ensures that mixture 120 retains desired structural properties even after perturbing has been completed.

FIG. 4 is a diagram illustrating an extruder 400 in an exemplary embodiment. Extruder 400 is shown in a cut-through view. FIG. 4 shows that extruder 400 includes a port 460 dimensioned to receive mixture 120. Mixture 120 remains an uncured semisolid/paste when it is placed into port 460. Mixture 120 may further be applied at a volume rate corresponding to an expected extrusion rate of extruder 400.

Extruder 400 also includes first section/chamber 462. Shaft 440 spins within section 462. The spinning of shaft 440 causes arms 450 to rotate about shaft 440 which in turn mixes mixture 120. Shaft 440 is driven by motor 410. The rotational speed of shaft 440 may be chosen to ensure that arms 450 do not chop or otherwise cut fibers 124. An exemplary speed of shaft 440 may therefore be less than five revolutions per second. The ratio of fibers to resin may affect viscosity. The temperature of the mixture may also affect viscosity, but ideally will be below a curing temperature (e.g., 290° F.) at which the resin cures into a solid polymer. Shell 470 provides structural support for section 462 and ensures that mixture 120 does not spill from section 462. First section 498 also includes vacuum port 464, which draws gas out from first chamber section 462.

First auger 452 draws from mixed mixture 120 within section 462 and compresses mixture 120 at a first compression pressure. The first compression pressure may be about twenty pounds per square inch (PSI). Second auger 494 draws mixture 120 from first auger 452 at location 480 into second section/chamber 496. Mixture 120 is drawn towards second chamber 496 via the rotating action of the first auger 452. Transition zone 466 serves as the exit from section 498 and the entrance to section 496. The second auger 494 operates at a higher compression pressure/ratio that causes auger 494 to apply a higher level of pressure than first auger 452. This means that section 496 experiences a second compression pressure that is higher than the first compression pressure. This higher level of pressure may range from three hundred to four thousand PSI. The increase in pressure applied by auger 494 forces air pockets out of mixture 120. This has the beneficial impact of further reducing the porosity of mixture 120 which in turn enhances structural strength. This may reduce the porosity of mixture 120 to less than one percent.

Auger 494 may utilize a shell 492 that exhibits increased structural strength when compared with shell 470. This ensures that shell 492 does not rupture under the increased pressure applied by auger 494. Shell 492 surrounds auger 494, and shell 492 may be heated to facilitate mixing processes. Mixture 120 exits extruder 400 via extruder die nozzle 499. Inline degassing techniques may also be utilized via vacuum port 464 as mixture 120 is perturbed at extruder 400. For example, a vacuum may be applied to section 462 during perturbing in order to ensure that no trapped air pockets/bubbles form within mixture 120. In this manner, a combination of progressive compression and degassing removes air pockets/bubbles from mixture 120.

FIG. 5 is a diagram illustrating further details of extruder die nozzle 499 of extruder 400 in an exemplary embodiment. Specifically, FIG. 5 corresponds with view arrows 5 of FIG. 4. FIG. 5 illustrates that extruder die nozzle 499 includes extrusion aperture 520. Any suitable shape may be chosen for extrusion aperture 520 in order to extrude a mixture 120 having a desired shape. Extruder die nozzle 499 also includes fixation points 530 by which extruder die nozzle 499 may be attached to extruder 400. Holes 540 in extruder die nozzle 499 are also illustrated. Holes 540 may be utilized to further secure extruder die nozzle 499 to extruder 400.

Illustrative details of the operation of resin impregnator 200 and extruder 400 will be discussed with regard to FIG. 6. Assume that a user has acquired a batch of dry short carbon fiber having fiber lengths that range from one quarter to one eighth of an inch. Assume also that the user wishes to impregnate the fiber with resin to form a mixture of fiber and resin.

Figure 6:
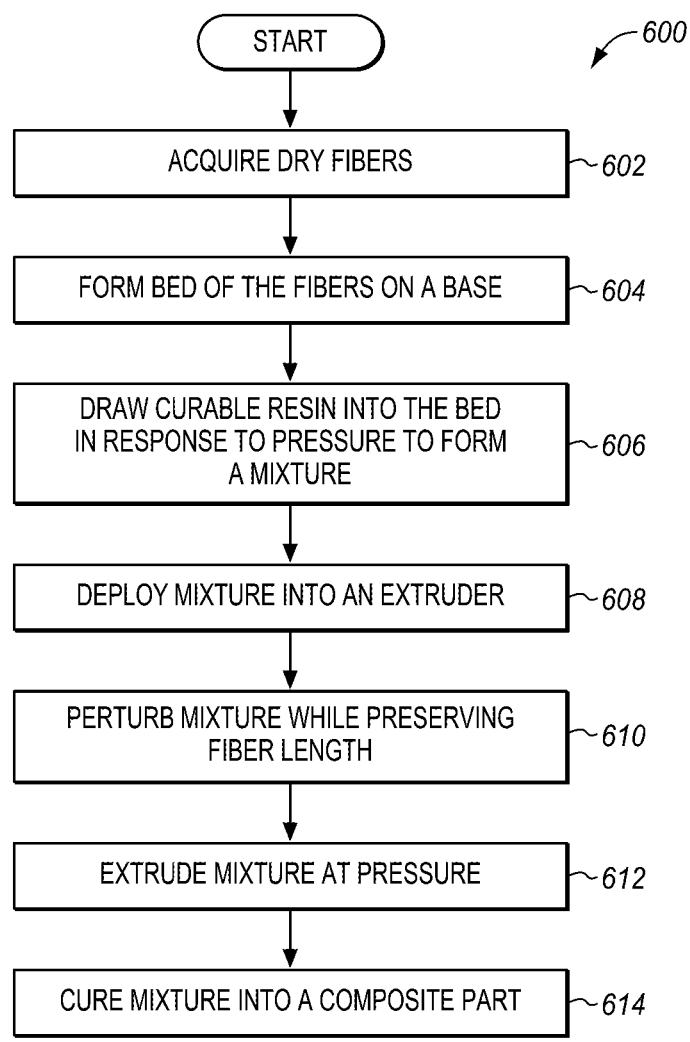
FIG. 6 is a flowchart illustrating a method for fabricating enhanced short-fiber composite materials in an exemplary embodiment.

FIG. 6 is a flowchart illustrating a method 600 for fabricating a short fiber composite material in an exemplary embodiment. The steps of method 600 are described with reference to resin impregnator 200 of FIG. 2. Those skilled in the art will appreciate that method 200 may be performed in other systems such as resin impregnator 300 of FIG. 3. The steps of the flowcharts described herein are not all inclusive and may include other steps not shown. The steps described herein may also be performed in an alternative order.

Method 600 includes acquiring a batch of randomly oriented dry fibers 124 (e.g., carbon fibers or fiberglass) that are less than one half of an inch long (step 602). These are referred to as short-fiber fibers. Method 600 further includes forming a bed 212 from the short fibers 124 on base 210 (step 604). Method 600 also includes drawing thermoset (i.e., curable) resin 122 through bed 212 in response to pressure (step 606). The pressure may be positive or negative pressure applied to bed 212 or resin 122. The pressure may range from twenty to ninety PSI. Drawing resin 122 through bed 212 of fibers 124 results in the formation of mixture 120. Mixture 120 exhibits a reduced level of porosity owing to the resin infusion process (i.e., owing to pressurized penetration of fibers 124 with resin 122). Further steps of method 600 ensure that the porosity of mixture 120 is even further reduced to below one percent by volume (e.g., by removing gases from mixture 120). Mixture 120 remains uncured at this time. This means that mixture 120 is a substantially viscous semisolid without voids at this point in time.

Mixture 120 is deployed into chamber 462 of section 498 of extruder 400 while mixture 120 remains in a semisolid state (step 608). Mixture 120 is mixed by arms 450 in chamber 462 of section 498 (step 610). Arms 450 perturb/stir mixture 120 while preserving fiber length. This means that fibers 124 are not damaged or chopped by arms 450. This may comprise shaft 440 revolving at a force or number of revolutions per second that is less than a threshold level at which fibers 124 would be cut by the internal moving components of extruder 400. In section 498, mixture 120 is perturbed/stirred at a first compression pressure (e.g., twenty to thirty PSI). Auger 452 of first section 498 moves mixture 120 towards second section 496. Auger 452 is fed by port 460. Mixture 120 continues through auger 452 into auger 494 as mixing/perturbation continues. Auger 494 is part of second section 496, which perturbs mixture 120 at a second compression pressure (e.g., hundreds of PSI) that is higher than the first compression pressure. Auger 494 moves mixture 120 towards die nozzle 499. Like auger 452, auger 494 preserves fiber length (i.e., does not break or chop the fibers). Mixture 120 may be extruded at a pressure of at least three hundred PSI (step 412). The pressure may vary depending on the embodiment from three hundred to four thousand PSI. Inline degassing is also used during perturbing and extrusion i.e., while compacting/compressing mixture 120). As section 462 is under vacuum during operation, no trapped air pockets or bubbles are formed in mixture 120. After extrusion, mixture 120 may comprise a pre-form of fiber and resin ready for curing.

Mixture 120 is formed into a composite part after extrusion. This process may be performed by curing mixture 120 into a solid and hardened composite part (step 614). Curing may be achieved by heating mixture 120 to a desired curing temperature that causes resin 122 to harden into a polymer. For example, the desired temperature may be 250° F. or 350° F.

Further embodiments of mixture 120 may include short-fiber fiberglass along with short-fiber carbon fiber. This provides multiple benefits. First, it provides for balanced material properties. Fiberglass has a lower strength and modulus of elasticity than carbon fiber, but has higher elongation properties, so fiberglass improves the elongation at break of the final cured material. Second, fiberglass enhances the ease of extrusion during manufacturing. Glass fibers act like a lubricant in the system and eliminate the phenomenon of "shark skin fracturing" during extrusion.

Thus, combining fiberglass and carbon materials helps to allow for more than fifty percent (by weight) carbon in the system.

In such embodiments, the short-fiber fiberglass may be mixed with the short-fiber carbon fiber, and the combination of carbon fiber and fiberglass may be added to bed 212 prior to resin impregnation. The length of the short-fiber fiberglass may be comparable or equal to the length of the carbon fibers. The further embodiments may therefore utilize a mixture that comprises at least twenty percent by weight fiber glass and at least thirty percent by weight carbon fiber. These embodiments may also be at least forty percent by weight resin.

EXAMPLES

In the following examples, additional processes, systems, and methods are described in the context of a fabrication system for short-fiber mixtures having low porosity.

Figure 7:
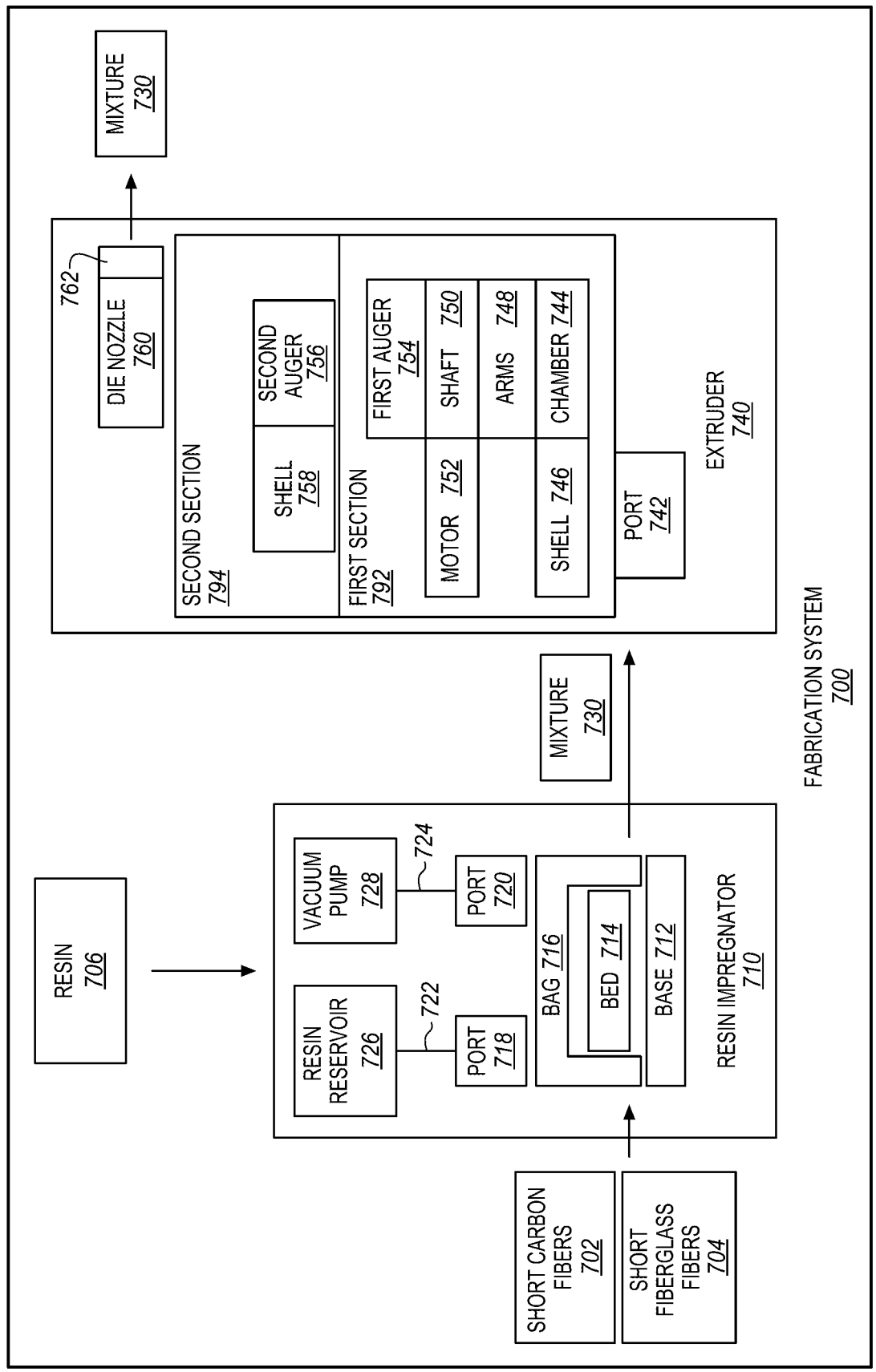
FIG. 7 is a block diagram of a fabrication apparatus for short-fiber composite materials in an exemplary embodiment.

FIG. 7 is a block diagram of a fabrication system 700 in an exemplary embodiment. Fabrication system 700 receives short carbon fibers 702 as well as short fiberglass fibers 704. Fibers 702 and 704 are premixed, and together form bed 714 of resin impregnator 710. Bed 714 is placed atop base 712. Bed 714 is also sealed by bag 716 to base 712. Vacuum pump 728 draws air pockets out of bed 714 via port 720 and line 724 by applying negative pressure. Resin reservoir 726 is filled with resin 706. Resin 706 is drawn, via a pressure differential, through supply line 722 and port 718 into bed 714. This impregnates bed 714 with resin 706. The impregnation of bed 714 with resin 706 results in mixture 730 having reduced porosity.

Mixture 730 is placed into port 742 of extruder 740. Mixture 730 travels from port 742 into chamber 744. Mixture 730 is mixed by arms 748 within chamber 744. Arms 748 are driven by shaft 750 and motor 752. Chamber 744 is also bounded by shell 746. Mixture 730 proceeds from chamber 744 to first auger 754. Chamber 744, first auger 754, motor 752, shaft 750, shell 746, and arms 748 comprise portions of first section 792. Degassing may occur within first section 792. Perturbing continues at second auger 756. Second auger 756 is bounded by a reinforced shell 758 capable of withstanding pressure at hundreds or thousands of PSI. Mixture 730 is extruded via extruder die nozzle 760 having a desired level of porosity that is reduced in comparison to traditional short-fiber mixtures. This means that mixture 730 may exhibit less than one percent porosity by volume. Second section 794 includes second auger 756 and shell 758.

Mixture 730 may further be extruded via aperture 762 in order to exhibit a desired cross-sectional shape. This may comprise shaping mixture 730 into a gap filler for a stringer of an aircraft. These gap fillers may extend for tens of feet and have a cross sectional area of less than a square inch. These gap fillers are referred to as noodles.

Figure 8:
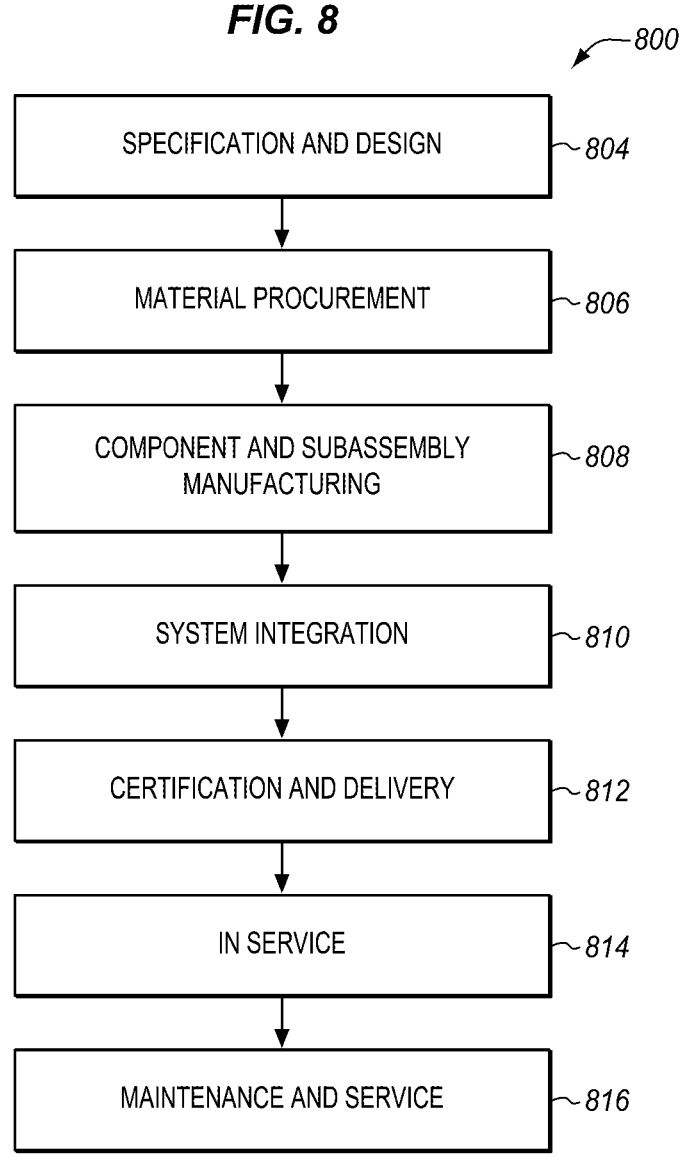
FIG. 8 is a flow diagram of aircraft production and service methodology in an exemplary embodiment.
Figure 9:
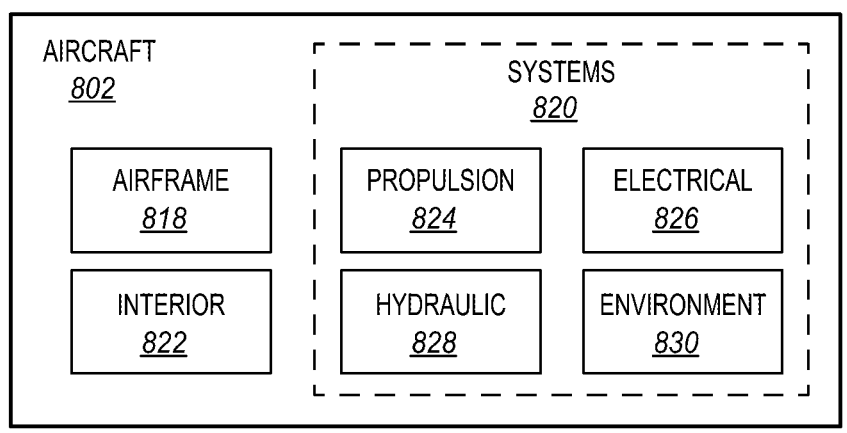
FIG. 9 is a block diagram of an aircraft in an exemplary embodiment.

Referring more particularly to the drawings, embodiments of the disclosure may be described in the context of an aircraft manufacturing and service method 800 as shown in FIG. 8 and an aircraft 802 as shown in FIG. 9. During pre-production, exemplary method 800 may include specification and design 804 of the aircraft 802 and material procurement 806. During production, component and subassembly manufacturing 808 and system integration 810 of the aircraft 802 takes place. Thereafter, the aircraft 802 may go through certification and delivery 812 in order to be placed in service 814. While in service by a customer, the aircraft 802 is scheduled for routine maintenance and service 816 (which may also include modification, reconfiguration, refurbishment, and so on). Apparatus and methods embodied herein may be employed during any one or more suitable stages of the production and service method 800 (e.g., specification and design 804, material procurement 806, component and subassembly manufacturing 808, system integration 810, certification and delivery 812, service 814, maintenance and service 816) and/or any suitable component of aircraft 802 (e.g., airframe 818, systems 820, interior 822, propulsion 824, electrical 826, hydraulic 828, environmental 830).

Each of the processes of method 800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 9, the aircraft 802 produced by exemplary method 800 may include an airframe 818 with a plurality of systems 820 and an interior 822. Examples of high-level systems 820 include one or more of a propulsion system 824, an electrical system 826, a hydraulic system 828, and an environmental system 830. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 800. For example, components or subassemblies corresponding to production stage 808 may be fabricated or manufactured in a manner similar to components or subassemblies produced while the aircraft 802 is in service. Also, one or more apparatus embodiments, method embodiments, or a combination thereof may be utilized during the production stages 808 and 810, for example, by substantially expediting assembly of or reducing the cost of an aircraft 802. Similarly, one or more of apparatus embodiments, method embodiments, or a combination thereof may be utilized while the aircraft 802 is in service, for example and without limitation, to maintenance and service 816. For example, the techniques and systems described herein may be used for steps 806, 808, 810, 814, and/or 816, and/or may be used for airframe 818 and/or interior 822. These techniques and systems may even be utilized for systems 820, including for example propulsion 824, electrical 826, hydraulic 828, and/or environmental 830.

In one embodiment, mixture 120 is cured into a composite part that comprises a portion of airframe 818, and is manufactured during component and subassembly manufacturing 808. The composite part may then be assembled into an aircraft in system integration 810, and then be utilized in service 814 until wear renders the composite part unusable. Then, in maintenance and service 816, the composite part may be discarded and replaced with a newly manufactured part. The various resin impregnators and extruders discussed herein may then be utilized to fabricate a new composite part.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. A method comprising:
forming a bed of randomly oriented dry fibers on a base;
drawing thermoset resin into the bed in response to pressure between twenty and ninety pounds per square inch to form an uncured semisolid mixture of randomly oriented fibers impregnated with the resin;
perturbing the uncured semisolid mixture while preserving fiber length at the mixture, and degassing the mixture via discrete arms in a first chamber of an extruder at a first pressure; and
extruding the mixture to form a preform via a screw-type auger in a second chamber of the extruder at a second pressure that is at least twice as high as the first pressure.

2. The method of claim 1, wherein:
perturbing the uncured semisolid mixture is performed via prongs which each extend from a discrete arm and curl towards an extrusion aperture of the extruder.

3. The method of claim 1 wherein:
extruding the uncured semisolid mixture results in the uncured semisolid mixture having a porosity of less than one percent by volume.

4. The method of claim 1 further comprising:
covering the bed with a vacuum bag; and
sealing the vacuum bag to the base.

5. The method of claim 1 further comprising:
placing resin atop the bed; and
applying positive pressure to the resin from above the bed, wherein
drawing the resin through the bed is performed in response to applying the positive pressure.

6. The method of claim 1 wherein:
the dry fibers comprise dry carbon fibers that have been mixed with dry fiberglass prior to forming the bed.

7. The method of claim 5 wherein:
the uncured semisolid mixture comprises at least twenty percent by weight fiber glass, at least thirty percent by weight carbon fiber, and at least forty percent by weight resin.

8. The method of claim 1 wherein:
the first pressure is twenty pounds per square inch, and the second pressure is between three hundred and four thousand pounds per square inch.

9. The method of claim 1 wherein:
the bed of randomly oriented fibers comprises fibers that are randomly oriented along all three spatial axes.

10. The method of claim 1 further comprising:
deploying the uncured semisolid mixture into an extruder that performs the extruding.

11. The method of claim 1 further comprising:
curing the uncured semisolid mixture into a composite part after extruding the uncured semisolid mixture.

12. The method of claim 1 wherein:
the uncured semisolid mixture is extruded at a pressure of at least three hundred pounds per square inch.

13. A method comprising:
forming a bed of randomly oriented dry fibers on a base;
drawing resin into the bed in response to pressure between twenty and ninety pounds per square inch to form an uncured semisolid mixture of randomly oriented fibers impregnated with the resin;
perturbing the uncured semisolid mixture while preserving fiber length at the mixture.

14. The method of claim 13, further comprising:
covering the bed with a vacuum bag.

15. The method of claim 14 further comprising:
sealing the vacuum bag to the base.

16. The method of claim 13 wherein:
the pressure is positive pressure applied to the bed.

17. The method of claim 16 further comprising:
placing resin atop the bed; and
applying positive pressure to the resin from above the bed, wherein
drawing the resin through the bed is performed in response to applying the positive pressure.

18. The method of claim 13 wherein:
the dry fibers comprise dry carbon fibers that have been mixed with dry fiberglass prior to forming the bed.

19. The method of claim 18 wherein:
the uncured semisolid mixture comprises at least twenty percent by weight fiber glass, at least thirty percent by weight carbon fiber, and at least forty percent by weight resin.

20. The method of claim 13 wherein:
the perturbing is performed via an extruder.

* * * * *